US005132943A

United States Patent [19]

Davies

[11] Patent Number: 5,132,943

[45] Date of Patent: Jul. 21, 1992

[54] WORLD GLOBE AND DRIVE ARRANGEMENT

[76] Inventor: Edward R. Davies, 327 Cardinal Way, Stuart, Fla. 34996

[21] Appl. No.: 802,124

[22] Filed: Dec. 3, 1991

[51] Int. Cl.[5] ........................ G04B 19/22; G09B 27/08

[52] U.S. Cl. ........................ 368/21; 368/23; 434/142

[58] Field of Search ........................ 368/21-27; 434/142-143

[56] References Cited

U.S. PATENT DOCUMENTS

| | | | |
|---|---|---|---|
| 1,152,904 | 9/1915 | Ramage | 368/23 |
| 1,720,902 | 7/1929 | Isaacson | 368/23 |
| 2,036,046 | 3/1936 | Harrison | 368/23 |
| 2,068,418 | 1/1937 | Kyack | 35/45 |
| 2,247,394 | 7/1941 | Mills | 368/23 |
| 2,490,185 | 12/1949 | Work | 240/2 |
| 2,492,785 | 12/1949 | Concordet | 35/46 |
| 2,496,827 | 2/1950 | Tellier | 35/46 |
| 2,680,308 | 6/1954 | Miltenberger | 35/47 |
| 2,785,528 | 3/1957 | Kernick | 58/44 |
| 3,049,863 | 8/1962 | Ranney | 58/44 |
| 3,197,893 | 8/1965 | Mariotti | 35/45 |
| 3,305,946 | 2/1967 | Gardin | 35/46 |
| 3,348,321 | 10/1967 | Cunningham | 368/24 |
| 3,370,415 | 2/1968 | McIlvaine | 58/44 |
| 3,520,073 | 7/1970 | Baader | 35/45 |
| 3,879,862 | 4/1975 | Chin | 35/45 |
| 4,308,604 | 12/1981 | Graham | 368/23 |
| 4,666,310 | 5/1987 | Snapka | 368/24 |
| 4,761,138 | 8/1988 | Niesyn | 434/143 |

*Primary Examiner*—Vit W. Miska
*Attorney, Agent, or Firm*—Richard M. Saccocio

[57] ABSTRACT

An electrically driven, world globe displaying Greenwich time, clock time, week of the year, season of the year and daylight-nighttime of a particular geographic location and a particular time of day relative to the rest of the world comprising a globe displaying a geographic arrangement of the world, a Greenwich time zone dial fixedly attached to said globe displaying Greenwich time relative to longitudinal locations of the geographic arrangement of the world, said globe and said Greenwich time zone dial together rotating in a first direction one revolution every twenty-four hours, a clock time zone dial rotating in a second direction opposite to said first direction, rotating one revolution once every twenty-four hours, a stationary geographic zone dial indicating cities and countries of the world. Said zone dials being arranged as levels of a frusto-conical structure with the world globe on top thereof with a north-south pole axis aligned with the axis of the frusto-conical structure, and an electrical drive motor for rotating said globe, said Greenwich time zone dial and said clock time zone dial.

23 Claims, 5 Drawing Sheets

WORLD GLOBE AND DRIVE ARRANGEMENT

BACKGROUND OF THE INVENTION

1. Field of the Invention

This invention pertains in general to a globe of the earth and in particular to a world globe in combination with apparatus which rotates the globe on a daily cycle as well as a yearly cycle such that the time, date, week, month, season, and year, are visually displayed and further in combination with light apparatus which lightens and darkens the appropriate portions of the globe in accordance with the seasonal variations in the daylight and nighttime cycles for any location on the world.

2. Description of the Prior Art

A number of globes and apparatus of the planet earth simulating the movement of the same about its axis and about the sun while visually displaying the varying daylight and nighttime cycle as well as the hour, date, and month of the year are disclosed in the prior art. There are sundry methods and apparatus to provide such movement of the planet earth and to visually display the same, as disclosed in the prior art statement which is submitted along with this application and is incorporated herein by reference.

The main elements utilized throughout the prior art to depict the daylight and nighttime cycles in conjunction with the time of year generally involve a clock mechanism in combination with a light source placed interiorly in a semitranslucent globe. Typically, there are dials associated with such apparatus, including clock apparatus for specifying the time of day at a particular geographical location as well as other time periods within the yearly cycle such as a week, a month, a season, etc. Much of the prior art disadvantageously requires a substantial amount of effort and involves fairly complex manipulations in setting up the globe to coincide with a particular date and time of a particular geographical location. However, for a world globe to be practical and convenient to its users, the initial set up should not be complicated or difficult to arrange.

The review of the prior art further shows that the prior art globes which portray the change of season experienced by the world globe as it simulates the rotation of its orbit about the sun collectively suffer from inconvenience and difficulty in being able to read the appropriate dials indicating the date, week, month, and time of year.

Accordingly, a primary object of the present invention is to provide a world globe which experiences a daily rotation about its own axis and simulates the seasonal effects of the day and nighttime cycles as it simulates the rotation in its orbit about the sun in such a manner as to be easily and quickly discernable as to these daily and seasonal events.

Another object of the present invention is to provide a world globe which indicates the time of day, the daylight and nighttime cycles, the week of the month, and the season of the year, and yet is easily initially set up as to a particular time and date in conjunction with a particular geographical location.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the scope of the breadth and scope of the claims here appended.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention accomplishes the above-stated objectives as well as others, stated or implied from a fair reading of this specification, including the claims and drawings appended hereto. The invention comprises a globe of the planet earth including: apparatus for rotating the globe on its axis once every approximate twenty-four hours, apparatus for simultaneously illuminating and darkening approximately one-half of respective portions of the globe indicating the daylight and nighttime cycles, and a support base for positioning the axis of the world in a vertical direction.

The support base includes a Greenwich time zone dial which rotates the globe approximately once every twenty-four hours, a local time indicator zone dial which is keyed and rotated with the Greenwich time zone dial, (the relationship being in accordance with a variable geographical location) and a clock time zone dial which indicates the time of the day at a chosen geographical location. A non-rotatable portion of the support base comprises a geographical location zone dial and includes thereon a listing of various major cities on the earth in accordance with their relative longitudinal geographical location. The stationary zone dial further includes a window which displays the week of the year in conjunction with the actual chronological week of the year.

A daytime-nighttime display cycle is provided by a circular light shield within the globe with a light source on one side thereof. The light shield and the light source remain rotationally stationary while the earth rotates on its approximate twenty-four hour cycle. The light shield and light source move angularly to reflect the seasonal change in the daytime-nighttime proportion in accordance with the position of the earth as the earth moves in its orbit around the sun.

A clock motion and appropriate gearing provide the relative movements of the moving parts of the globe.

Means are provided to allow disconnecting of the drive mechanism of the globe to set up the globe for a particular time at a particular geographical location of the earth such that the local time, the Greenwich time zone, and the week of the year in conjunction with the appropriate daytime-nighttime seasonal proportion are simultaneously and correctly displayed by the globe.

Further, a lazy susan connection between the base of the globe and a support member is provided to allow the globe and the base to be rotated as a unit to enable viewing of any part of the globe relative to a local geographical location set at the local time and season thereof.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

Figure 1:
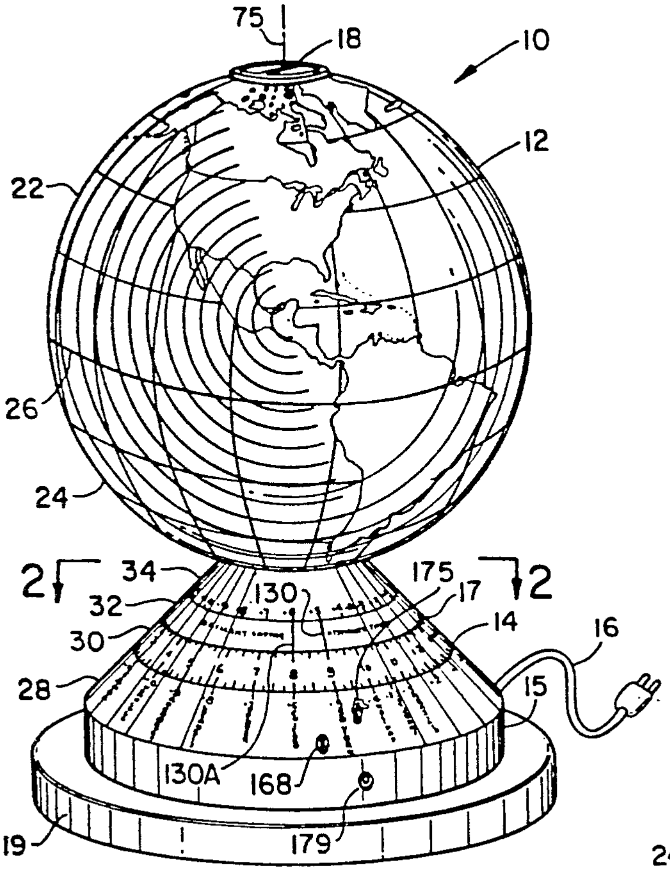
FIG. 1 illustrates an overall isometric view of the world globe and the chronological display apparatus of the present invention.

As required, a detailed embodiment of the present invention is disclosed herein; however, it is to be understood that the disclosed embodiment is merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

Referring now to the various figures of the drawings, in FIG. 1 there is shown an overall isometric view of the inventive globe and drive arrangement 10. The clean, aesthetically appealing lines of the world globe and drive arrangement 10 is clearly shown in FIG. 1. The configuration of a round globe and a truncated conical base presents a pleasing geometrical balance.

The world globe 12 sits on top of a base 14 in an upright or non-tilted manner. Thus, the axis 75 upon which the world globe rotates is set substantially in alignment with the longitudinal axis of the base 14. This arrangement allows a person viewing the world globe and drive arrangement 10 to view south as straight down, north as straight up, and with east and west perpendicular thereto. To account for this difference from the actual arrangement of the earth orbiting on a tilted axis about the sun, a light shield 72 within the world globe 10 is tilted at an appropriate angle. In this manner, the correct and proper daytime/nighttime proportional arrangement and the tilt of the earth during the different seasons of the year is presented as will be more fully explained hereinafter.

The base 14 comprises a relatively cylindrical lower portion 15 attached to the large diameter of a frusto-conical upper base portion 17; base 14 sits on support member 19. An electrical cord and plug 16 emanates from an appropriate opening through the cylindrical surface of support member 19. Electrical cord and plug 16 provides for supplying electrical power to the various drive mechanisms and light means of the inventive globe and drive arrangement 10.

The frusto-conical upper base portion 17 of base 14 is divided into four horizontal zones, each comprising a frusto-conical cone which when fitted together on top of each other forms the overall frusto-conical cone upper base portion 17. The uppermost zone comprises a Greenwich time zone dial 34 which is fixedly attached to globe 12 and rotates therewith. On the conical surface of Greenwich time zone dial 34, are spaced markings corresponding to the world's twenty-four time zones starting with zero and progressing in individual hourly increments through a plus twelve and a minus twelve hours as the numbering extends around the periphery of Greenwich time zone dial 34. (See FIG. 2.) The zero on Greenwich time zone dial 34 is oriented in line with the prime meridian line that runs through Greenwich located in London, England (Great Britain) of world globe 12.

Local time indicator zone dial 32 extends downward from the bottom of Greenwich time zone dial 34 and includes a marking line 130 for eastern time and a marking line 130A for daylight savings time on its conical surface. Local time indicator zone dial 32 is releasably attached to Greenwich time zone dial 34 such that the marking line 130 may be oriented with regard to the world time zone of the geographical location of the user (on Greenwich time zone dial 34) and when thus set, local time indicator zone dial 32 rotates in conjunction with Greenwich time zone dial 34. In order to orient local time indicator zone dial 32 and Greenwich time zone dial 34 to each other, it is simply necessary to hold local time indicator time zone dial 32 while rotating globe 12 (and Greenwich time zone dial 34) to line up the marking line 130 or 130A as appropriate with the particular time zone of the user. Once this relative orientation is set, local time indicator time zone dial 32 and Greenwich time zone dial 34 rotate together such that the local time indicator time zone dial 32 and Greenwich time zone dial 34 and globe 12 make one revolution every twenty-four hours.

Figure 4:
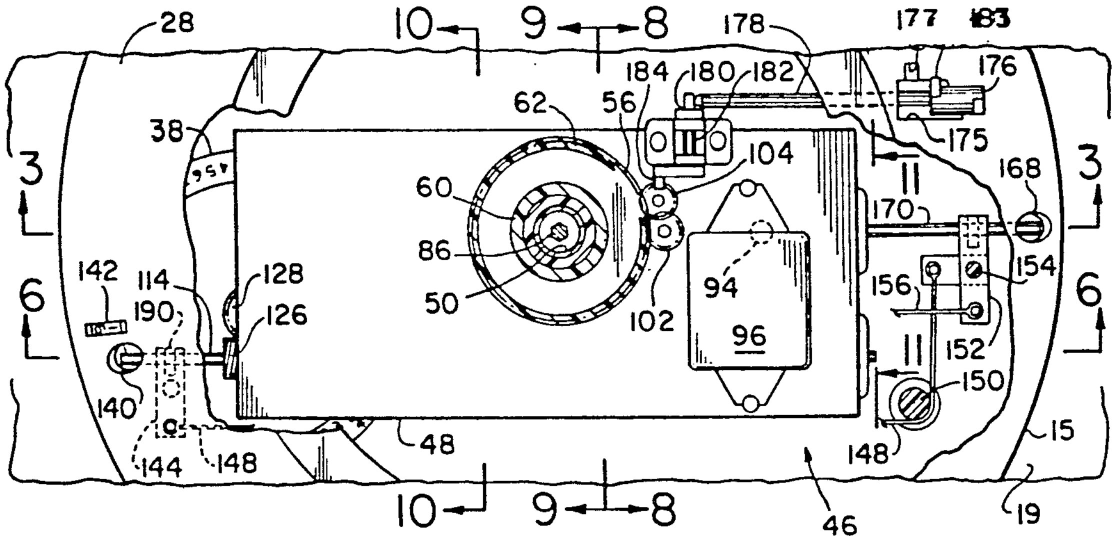
FIG. 4 is a cross-sectional view taken along the line 4—4 of FIG. 3.

The next downwardly descending zone on base 14 comprises a clock time zone dial 30 having clock markings thereabound. Hence, the numbers noon through twelve (midnight) and midnight through twelve (noon) are permanently fixed on the conical surface of clock time zone dial 30. The hourly time markings on clock time zone dial 30 may be further broken down into one-quarter hour markings to allow a user to more closely approximate the exact time. Clock time zone dial 30 rotates in a direction opposite to that of local time indicator time zone dial 32 and Greenwich time zone dial 34. In this regard, local time indicator time zone dial 32 and Greenwich time zone dial 34 rotate counterclockwise when viewed downward as shown in FIG. 4 of the drawings, while clock time zone dial 30 moves clockwise when viewed in the same direction.

Figure 2:
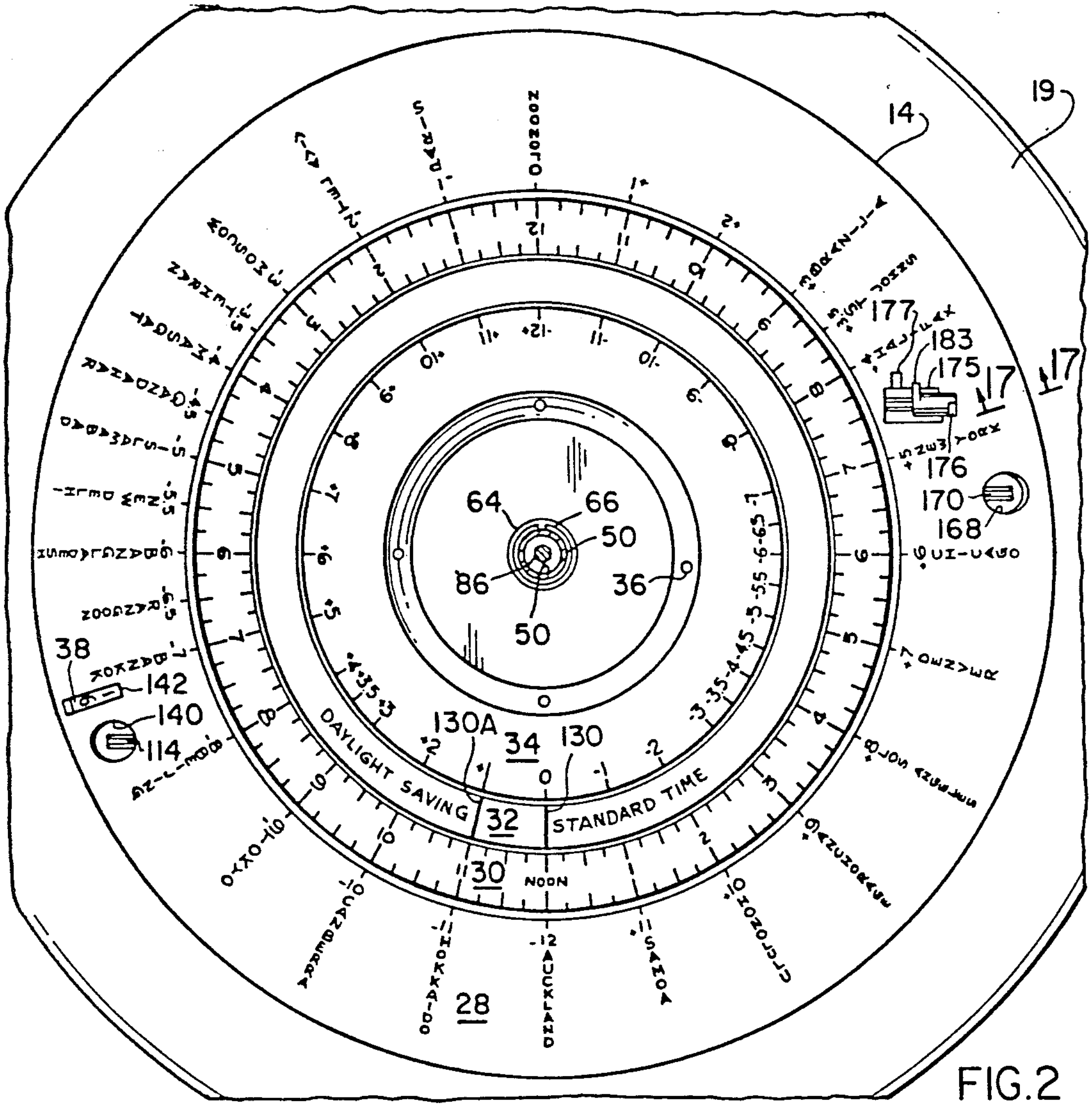
FIG. 2 is a top view of the support base of the present invention indicating the various readings associated with each of the zone dials taken along the line 2—2 of FIG. 1.

Geographical zone dial 28 extends downwardly from clock time zone dial 30 and meets with the cylindrical portion 15 of base 14. Geographical zone dial 28 does not rotate relative to cylindrical portion 15. However, base 14 and globe 12 may together rotate as a unit relative to support member 19 by means of a "lazy susan" connection 21 therebetween. Geographical zone dial 28 has markings thereon indicating the various geographical locations of the major cities of the world spaced from each other by a distance equal to the longitudinal spacings between said cities on the globe 12 and extend around the conical periphery of geographical zone dial 28 as shown in FIG. 2. The particular cities marked on geographical zone dial 28 are seen in FIG. 2 of the drawings. Any location on globe 12 between the marked cities may be appropriately marked by the user at the approximate location of the unmarked city between the marked cities on geographical zone dial 28.

In accordance with the above-described zones, the location of Greenwich time zone dial 34 is fixed relative to that of the globe 12 such that the markings on Greenwich time zone dial 34 correspond with the meridian time zones of the world. Local time indicator time zone dial 32 is arranged relative to Greenwich time zone dial 34 such that marking line 130 is oriented relative to the particular meridian time zone of the user. Time zone dial 30 is then oriented relative to the particular city on geographical zone dial 28 within which the user is located such that it corresponds to the twenty-four hour clock time at the location of the user. Then, clock time zone dial 30 and geographical zone dial 28 are oriented relative to local time indicator time zone dial 32 and Greenwich time zone dial 34 such that the actual time of the user displayed on clock time zone dial 30 is set at the marking line 130 of local time indicator time zone dial 32 as described hereinafter. In this manner, the user has established his particular geographical location and time as displayed on base 14 relative to the world globe 12.

Because of the provision of the "lazy susan" connection 21 between support member 19 and the base 14 as shown in FIG. 2, the user can rotate the globe 12 at the base 14 as a unit to observe a particular geographical spot on globe 12 or base 14.

The globe 12 comprises a spherical shell 11 having a northern hemisphere 22 and a southern hemisphere 24 with a horizontal joint 26 at the equator line between said hemispheres. The geographic features of the earth's surface may be marked on the spherical surface of spherical shell 11 consistent with prior art markings of the same. The horizontal joint 26 at the equator line of world globe 12 is provided to allow access into the interior space of spherical shell 11 in order to initially insert and arrange day/season light apparatus 20 therewithin. After the initial assembly, access to day/season light indicating apparatus 20 is through a port 23 which has closure member 18. Closure member 18 is fitted with detent means (not shown) for retention within port 23. Globe 12 is fixedly attached to Greenwich time zone dial 34 such as by screws 68 in screw holes 36 so that globe 12 rotates with Greenwich time zone dial 34 (FIG. 3).

Figure 7:
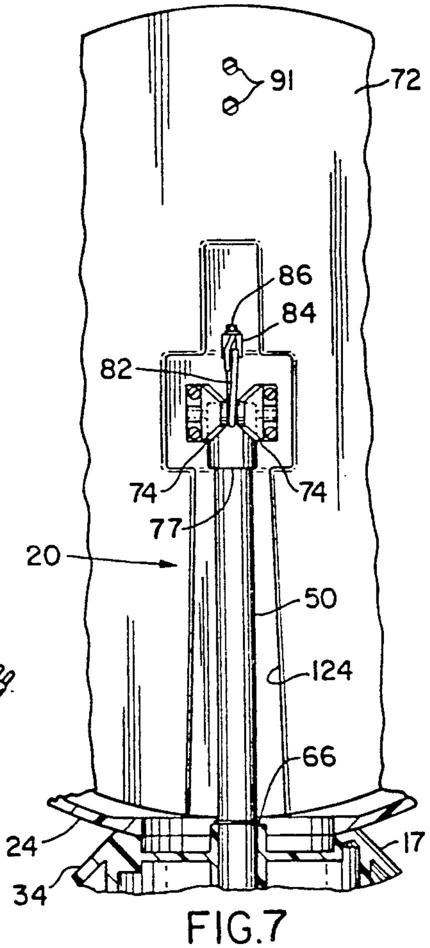
FIG. 7 is a view of the tilt mechanism of the light shield taken along the line 7—7 of FIG. 3.
Figure 8:
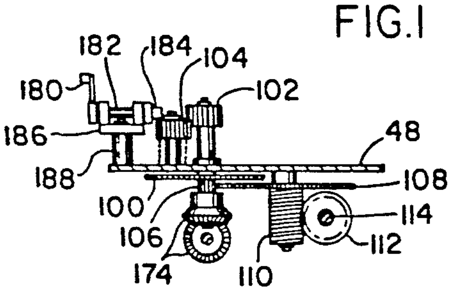
FIG. 8 is a view of the clock time zone dial drive cycle apparatus taken along the line 8—8 of FIG. 4.
Figure 9:
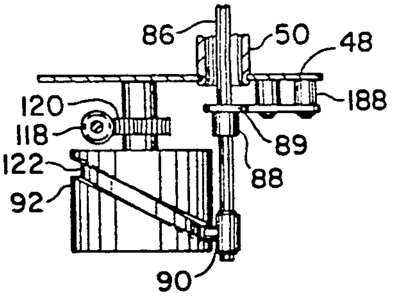
FIG. 9 is a cross-sectional view of the daytime nighttime cam drive taken along the line 9—9 of FIG. 4.
Figure 10:
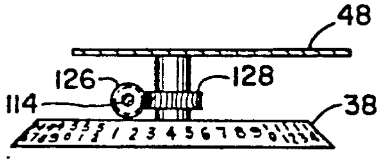
FIG. 10 is a partial view of the calendar week dial and drive shaft taken along the line 10—10 of FIG. 4.
Figure 3:
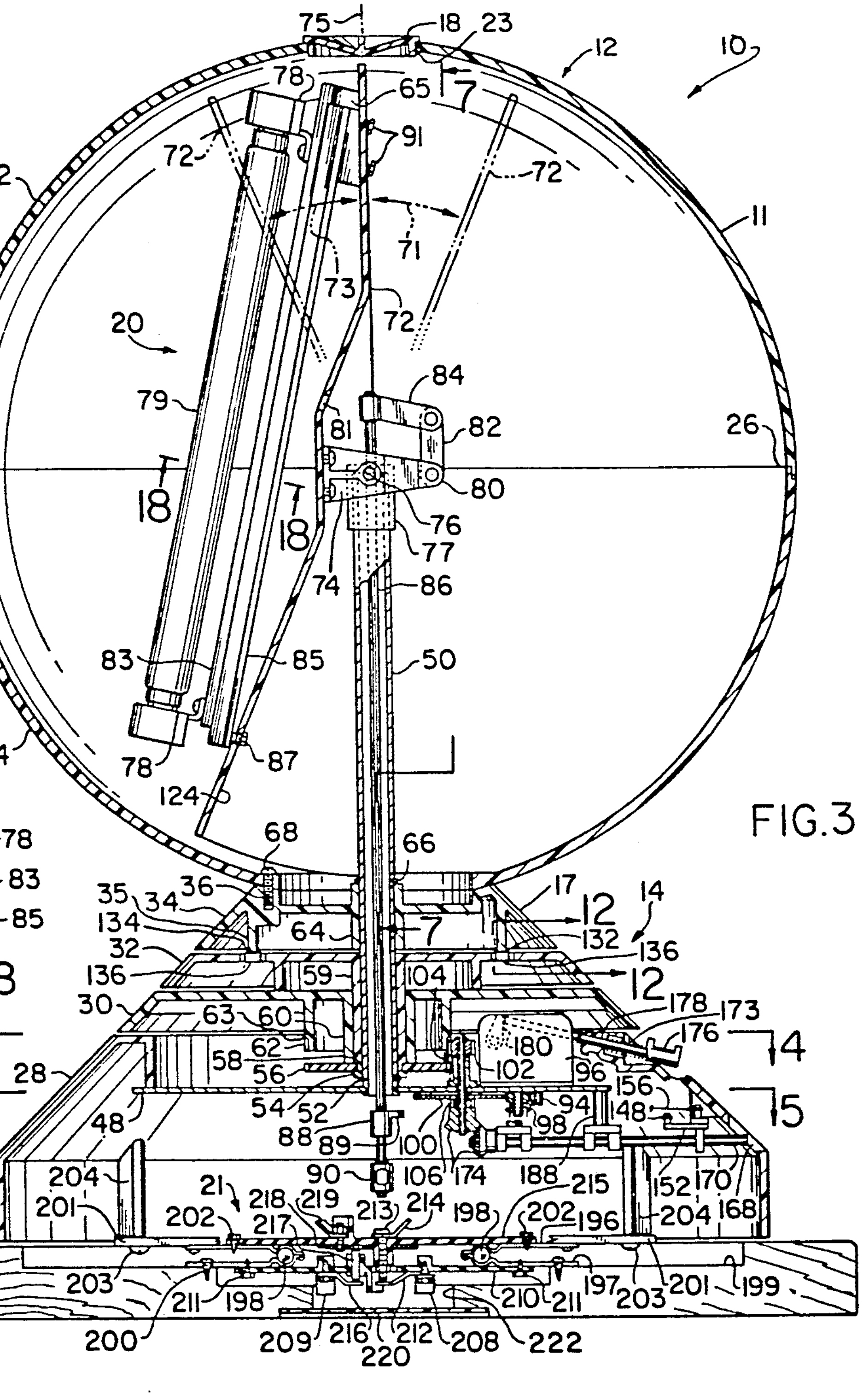
FIG. 3 is a multi-level sectional view taken along the line 3—3 of FIG. 4 with the globe section included.

FIGS. 3, 7, and 9, together, depict most of the details of the day/season light indicating apparatus 20 (hereinafter lighting apparatus 20) the effect of which is shown in FIG. 1 by the shading lines on the globe 12. Lighting apparatus 20 comprises a main support tube 50 which is fixedly connected, such as by swaging or welding, to a chassis plate 48. Support tube 50 extends vertically from chassis plate 48 and through the geometric center 75 of base 14 and globe 12. A forty-eight tooth gear 56 is mounted concentrically with support tube 50 a small distance above chassis plate 48. Forty-eight tooth gear 56 is key connected to a lower end 58 of a hub 59 of the local time indicator time zone dial 32 independent of support tube 50 which does not rotate. A bearing washer 54 supported by the support tube 50 through the use of a snap ring 52 allows for the counterclockwise rotational motion of local time indicator time zone dial 32 around support tube 50. Since Greenwich time zone dial 34 is mechanically attached to local time indicator time zone dial 32, globe 12 rotates counterclockwise in accordance with the motion of local time indicator time zone dial 32.

Figure 12:
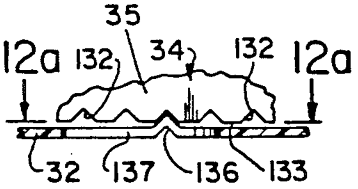
FIG. 12 is a partial view of the locking arrangement between the globe drive and the zone drive taken along the line 12—12 of FIG. 3.
Figure 12A:
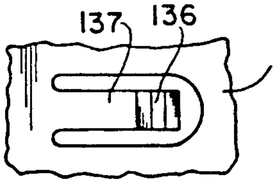
FIG. 12*a* is a plan view taken along the line 12*a*—12*a* of FIG. 12.

FIGS. 12 and 12*a* depict the releasable mechanical connection between local time indicator time zone dial 32 and Greenwich time zone dial 34. A bottom edge 133 of a cylindrical flange 35 extending downwardly from and interiorly of Greenwich time zone dial 34 is provided with a plurality of spaced vee grooves 132. A top planar surface 33 of local time indicator time zone dial 32 is provided with two diametrically opposed vee-shaped protrusions 136, each connected to a cantilever spring pawl 137 which mate with two of the plurality of spaced vee grooves 132. In this manner, Greenwich time zone dial 34 sits on the top of local time indicator time zone dial 32 and is supported thereby by the two vee-shaped spring-loaded protrusions 136. Through the use of gravity, snap ring 66, and the mating fit of protrusions 136 and grooves 132, Greenwich time zone dial 34 and therefore globe 12 are thereby driven by local time indicator time zone dial 32. Since Greenwich time zone dial 34 is resting on local time indicator time zone dial 32, rotation of the globe 12 while holding stationary local time indicator time zone dial 32 by hand force causes rotation of the Greenwich time zone dial 34 by bending of the pawls 137 such that the vee protrusions 136 disengage from the mating vee grooves and allows repositioning of the Greenwich time zone dial 34 relative to the local time indicator time zone dial 32. When a new desired location is achieved, two different vee grooves 132 mate with the vee protrusions 136 of pawls 137. The new position of Greenwich time zone dial 34 relative to local time indicator time zone dial 32 may, for example, correspond to the particular Greenwich time zone marked on Greenwich time zone dial 34 within which the user is located.

A hub 64 of Greenwich time zone dial 34 and a hub 59 of local time indicator time zone dial 32 provides for concentric alignment of Greenwich time zone dial 34 and local time indicator time zone dial 32 relative to support tube 50 and therefore to each other as can be seen in FIG. 3. An upper snap ring 66 and the lower snap ring 52 in respective circumferential grooves in support tube 50 maintains Greenwich time zone dial 34 and local time indicator time zone dial 32 in their axial position relative to support tube 50. Hence, snap rings 66 and 52 provide the upper and lower limits respectively, of the axial connection between Greenwich time zone dial 34 and local time indicator time zone dial 32 with respect to support tube 50 with enough axial clearance to allow Greenwich time zone dial 34 and local time indicator time zone dial 32 to have independent rotational freedom relative to support tube 50.

Globe 12 and base 14 are positioned on a support member 19 which may be fabricated from wood or other like material as mentioned above. The "lazy susan" slip ring mechanism 21 positioned between base 14 and sub-base 19 allows a user to turn globe 12 and base 14 together to view any geographical location on globe 12 without disturbing the arrangement between the light apparatus 20, the plurality of zone dials 34, 32, 30, and 28 relative to each other and to globe 12. Slip ring mechanism 21 comprises an upper plate 196 and a lower plate 197 with ball bearings 198 interposed therebetween such that relative rotation can occur between upper 196 and lower 197 plates. A recess 199 within support member 19 and the hollow inside of geographic location zone dial 28 provides space for the location of slip ring mechanism 21. Wood screws 200 are used to fasten lower plate 197 to support member 19. Screws 202 fasten upper plate 196 to beam members 201 which in turn are fastened to bosses 204 within the interior of zone dial 28 by screws 203.

The daytime light and the nighttime darkness of the world globe 12 for a particular geographic location at a particular time of the year is provided by a light shield 72 in combination with a light source 79 and further in combination with axial motion of a hexagonally-shaped connecting rod 86 as it moves relative to a groove 12 in a cylindrical cam 92. The motion of cam 92 as caused by the shape of groove 122 is in accordance with the yearly orbit of the earth around the sun.

Again referring to FIGS. 3, 7, and 9, it is seen that hexagonal connecting rod 86 extends vertically within support tube 50. The lower end of connecting rod 86 is connected to a groove 122 of a cylindrical cam 92 by a small cylindrical cam follower rod 90 which is fixedly attached to connecting rod 86 and fits within the groove 12. A linkage arm 84 is rigidly connected to the upper end of connecting rod 86 and at an angle slightly less than 90°. Each of a pair of bracket members 74 is pivotally connected at 76 to a cap fitting 77 on support tube 50 at its upper end within globe 12. Fitting 77 also serves as an upper bearing for the upper end of connecting rod 86 and is provided with a vertical clearance slot for wiring. A linking member 82 is pivotally attached between the extending end of arm 84 and end 80 of brackets 74. In accordance with this arrangement, motion of the connecting rod 86 vertically within support member 50 caused by rotation of cam 92 and movement of cam follower 90 within groove 122 imparts tilting motion to a light shield 72 which is attached to the other end of bracket 74.

At the lower end of connecting rod 86, a guide member 88, having a hexagonal opening therethrough and within which the connecting rod 86 extends is fixedly connected by fasteners 188 to chassis plate 48. Guide member 88 in combination with the upper bearing of cap 77 provide for proper axial alignment of and axial movement of connecting rod 86 within support tube 50.

Light shield 72 comprises a generally circular disk having a diameter slightly smaller than the interior diameter of the spherical shell 11 comprising the world globe 12. Light shield 72 is mounted to brackets 74 at the approximate center location thereof. In accordance with the axial motion of connecting rod 86, the axial motion of arm 84 and the linking motion of arm 82 cause brackets 74 to pivot around pin 76 on support tube 50 and thereby causes light shield 72 to tilt in either a summer direction 71 or a winter direction 73 (relative to northern hemisphere) as indicated by the arrows so numbered in FIG. 3 of the drawings. A clearance recess 124 (FIG. 7) is formed within light shield 72 so as to extend light shield 72 around support tube 50 and prevent interference therewith when the globe 12 is rotating relative to light shield 72 and when light shield 72 is tilting relative to globe 12.

An electrical light 79 is provided on one side of light shield 72 which, of course, registers daylight on that side of light shield 72 with nighttime darkness being registered on the other side of light shield 72. A pair of sockets 78 are fitted at opposite ends of light 79 which in turn are attached by a support base 83 and a track 85 to light shield 72 by screws 87 and 91. See FIGS. 3 and 7. Service to light 79 is provided through port 23 in the upper part of globe 12 which is normally covered by closure member 18.

As explained above, the tilting motion imparted to light shield 72 is controlled by the axial movement of connecting rod 86 in conjunction with cam follower 90 within the groove 122 of cam 92. Cam 92 is, in turn, connected to a clock motor 96 though worm 118 which is connected to worm wheel 120 which according to the gearing as hereinafter explained, rotates cam 92 one rotation per year. (See FIGS. 5 and (). The annual cycle thus provided by cam 92 in conjunction with the tilting motion of light shield 72 provides for the change of seasons experience by the earth as it rotates in an elliptical cycle about the sun and while tilted at an angle of twenty-three degrees twenty-seven minutes. Because of the tilt of the earth's axis in its orbit around the sun, when the northern hemisphere of the earth is experiencing summer, the southern hemisphere is experiencing winter and vice-versa. Summer in the northern hemisphere exists when the north pole is tilted toward the sun and while the south pole is tilted away from the sun. This is reflected in FIG. 3 by the tilting motion 71 of light shield 72 whereby the lighted half of the globe includes the north pole 75. Similarly, the winter of the northern hemisphere is reflected in FIG. 3 when the dark side of light shield 72 moves in accordance with direction 73 such that the north pole 75 is on the darkened side of light shield 72. The positions of the light shield 72 shown in phantom in FIG. 3 of the drawings, represents the furthermost tilting of the light shield 72 during winter on December 22, and during summer on June 21, the winter solstice and the summer solstice, respectively. Intermediate of these extremes are the vernal equinox (March 21) and the autumnal equinox (about September 23).

Except for a schematic showing in FIG. 15, the internal electrical wiring for the inventive world globe 10 is not shown in the drawings but will now be described. A two-wire 110 volt line cord 16 is positioned within an appropriate recess in support member 19 and connected to terminals 208 and 209, which are mounted on a lower insulator 210. Insulator 210 is secured to the slip ring mechanism 21 by screws 211. Electrically continuous with terminal 208 is a leaf spring 212 which makes electrical contact with a center bolt 213.

Bolt 213 also serves to secure a terminal 214 to an upper insulator 215. When the geographic locator zone dial 30 is rotated relative to support member 19, bolt 213 rotates therewith while maintaining contact with leaf spring 212.

The second terminal 209 on the underside of insulator 210 is similarly electrically connected to a leaf spring 216, which, in turn, is biased against a pin 217. Pin 217 is in 360 sliding contact with an electrical contact transfer plate 218. Plate 218 is held co-axially about a dependent hub on upper insulator 215. An electrical connection is also made from plate 218 through insulator 215 to a second terminal 219 on the upper side of insulator 215. Terminals 214 and 219 thereby provide a 110 volt source available for connection to conventional wiring within base 14 and globe 12 to motor 96, switch 181 and light 79. A bore 222 through support member 19 provides for access to terminals 208 and 209. A plastic disc 220 is used to cover bore 222 and isolate terminals 214 and 219 from exposure.

Wiring to light 79 is passed through a slot 89 provided in guide member 88, through support tube 50, parallel to rod 86, through a vertical slot provided in opening in cap 77, through opening 81 in light shield 72, and to sockets 78. Wiring between opening 81 and sockets 78 may be made of highly flexible and extendable coiled cord so that light 79 may be removed through opening 23 together with sockets 78 and support base 83 if necessary.

Figure 18:
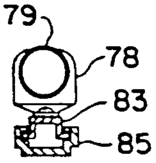
FIG. 18 is a sectional view taken along the line 18—18 of FIG. 3.

Sockets 78 for six watt light bulb 79 are attached by screws to support base 83 as seen in FIGS. 3 and 18. Base 83 is proportioned to slide freely within a track 85. Also, a lower end of track 85 is secured to light panel 73 with a screw 87. The upper end of track 85 is secured to light panel 73 by a guide block 65 and suitable screws 91.

The motion of the globe 12 and Greenwich time zone dial 34 by local time indicator time zone dial 32, and clock time zone dial 30 are provided by a single clock motor 96 mounted within the interior of base 14. Motor 96 is also used to drive a week dial 38 which has the numbers from zero through fifty-two thereon to chronologically denote the particular week of the year within which the inventive mechanism 10 is operating. (See FIGS. 4 and 5). The sequence of operation from motor 96 is depicted in FIG. 16 of the drawings, where the end result comprises motion imparted to clock time zone dial 30, local time indicator time zone dial 32, light shield 72, and week dial 38 and whereby motion of the local time indicator time zone dial 32 drives globe 12 and Greenwich time zone dial 34.

Figure 16:
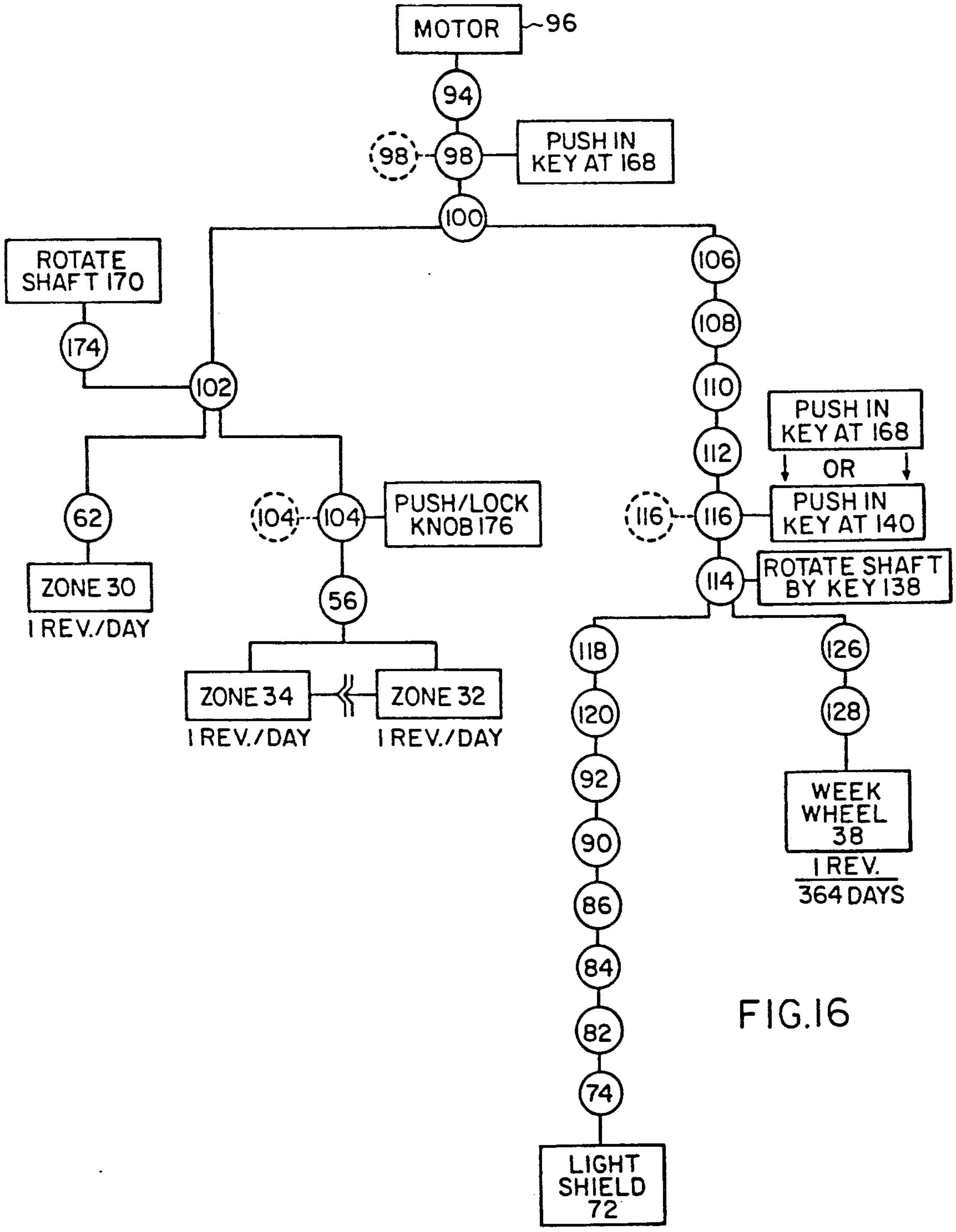
FIG. 16 is a schematic drawing of the sequence of operation of the working of the gears and disconnections of the world globe as provided by the present invention.

In following FIG. 16 of the drawings, it is seen that motor 96, which comprises a synchronous 38.4 rev/day clock motor and which is electrically driven, includes a motor shaft having a ten tooth pinion gear 94 attached thereto which meshes with sixteen tooth idler gear 98 (FIG. 3). Motor 96 and gear 98 are each attached chassis plate 48. A twelve tooth hub gear 106 is coaxially mounted to sixty-four tooth gear 100 which is driven by gear 98. From lower gear 100, the take off motion is split into two directions. One direction involves clock time zone dial 30 together with local time indicator time zone dial 32. The other direction involves the light shield 72 and the week zone dial 38. Following the zone dial motion, an eight-tooth upper tandem gear 102 is connected coaxially with lower gear 100 at the upper location thereof. A forty-eight tooth gear 62 integrally provided with a cylindrical flange 63 interiorly of clock time zone dial 30 meshes with gear 102 and is driven thereby. An eight-tooth idler gear 104 also meshes with gear 102 which rotates forty-eight tooth gear 56 which, as we have previously seen, is keyed to the hub 59 of local time indicator time zone dial 32. And, as we have also previously seen, rotation of local time indicator time zone dial 32 results in rotation of Greenwich time zone dial 34 which rotates globe 12.

The remaining travel path from gear 100 is transmitted from the lower portion thereof by the twelve tooth hub gear 106 which is coaxially mounted on the shaft supporting gear 100. Gear meshes with seventy-two tooth gear 108 (FIG. 5) which, in turn, drives worm 110. Worm wheel 112 which is attached to shaft 114, is driven by worm 110. Rotation of shaft 114 results in rotation of worms 118 and 126 which respectively rotate cam 92 through worm wheel 120, and rotate week dial 38 through worm wheel 128. (See also FIG. 5) As previously explained, rotation of cam results in movement of cam follower 90 within the groove 122 of cam 92 and thereby causes connector rod 86 to move up and down within support tube 50 and thereby impart tilting motion to light shield 72.

In order to set up the inventive globe assembly to the geographical location the Greenwich time zone, and the clock time and date of the user, certain disconnecting apparatus are provided within the drive arrangement as shown within FIGS. 4, 5, 6 and 14 of the drawings. The disconnecting apparatus allows for independent rotation of the globe 12 relative to the local time indicator time zone dial 32, independent rotation of the clock time zone dial 30 relative to the globe and local time indicator time zone dial 32, independent motion of cam 92, and the independent motion of week wheel 38 relative to themselves and the other drive mechanisms.

Reference is now also made to the remaining figures of the drawings. As seen above, globe 12 together with Greenwich time zone dial 34 are driven by local time indicator time zone dial 32 through the action of motor 96 but are adjustable independent of each other through the mechanism of the vee grooves 132 and the vee-shaped protrusion 136 which allow the globe and the Greenwich time zone dial 34 to be rotated together but independently of local time indicator time zone dial 32 and then reestablish the mechanical connection between the two.

Figure 5:
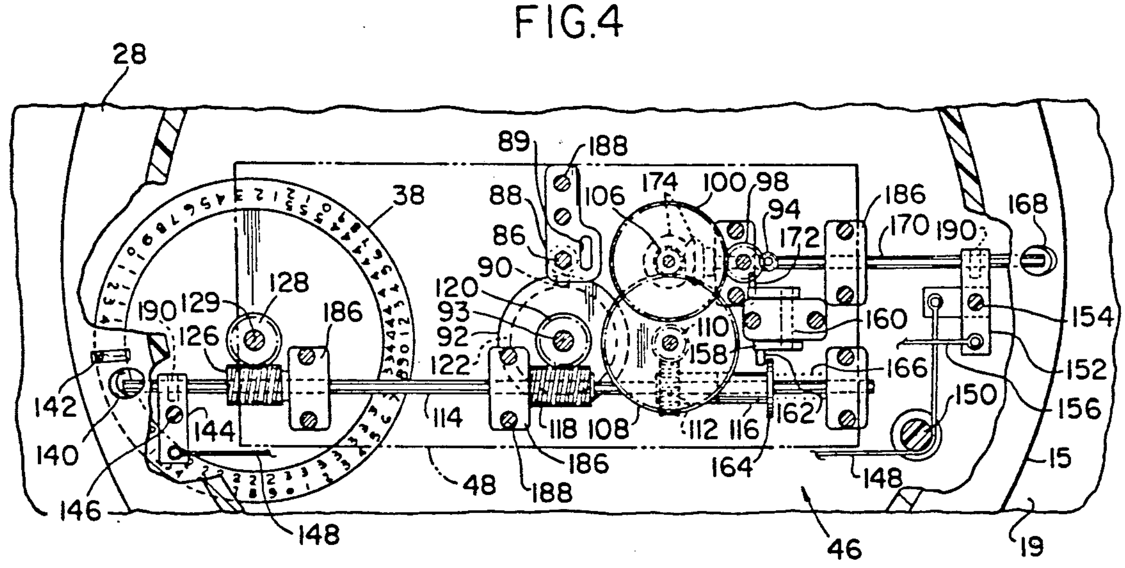
FIG. 5 is a cross-sectional view taken along the line 5—5 of the base of FIG. 3.
Figure 6:
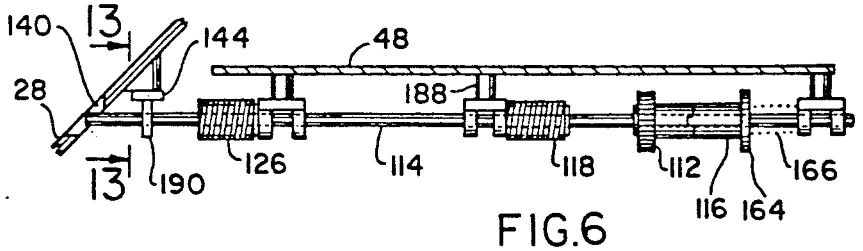
FIG. 6 is a partial view of the drive shaft and clutch arrangement for rotating the week of the year dial taken along the line 6—6 of FIG. 4.

In order to adjust the week wheel 38 to allow the proper chronological week of the year to appear at a window 142 in geographic zone dial 28 and in conjunction therewith to set the tilt of the angle of light shield 72 to coincide with the tilt of the earth relative to the sun for that particular chronological week, access port 140 and the slight extension of shaft 114 therethrough is utilized. An appropriate hexagonal drive member 138 (FIG. 14) sized to fit the hexagonal configuration of shaft 114 is inserted through access port 140 and is used to apply a pushing force on flange 190 of lever 144. The response to the pushing action causes lever 144 to rotate about pin 146 in a clockwise direction. (FIGS. 4 and 5.) The motion of lever 144 causes a cable 148 attached to an end of lever 144 to be pulled to the left when viewing FIG. 5 of the drawings. The other end of cable 148 is connected to a tee-shaped lever member 152 after passing about a guide pin 150. Due to its mechanical arrangement, lever member 152 rotates counterclockwise about pin 154. This direction of motion causes cable 156 attached to one end of tee-shaped lever member 152 to be pulled in a direction to the right as viewed in FIG. 5 of the drawings. The other end of cable 156 is connected to a crank member 160 having a first crank arm 158 and a second crank arm 172 attached thereto. Crank arm 158 includes an arm 162 extending therefrom. Accordingly, the motion of cable 156 causes rotation of crank arm 158, which rotation causes arm extension 162 to push on a flange 164 attached to a clutch member 116. The pushing action of arm extension 162 to the flange 164 of clutch member 116 causes compression of spring 166 and motion of clutch member 116 to the right and out of engagement with worm wheel 112. Shaft 114 is now free wheeling and is not connected to motor 96. Rotation of shaft 114 by the drive member 138 which is still attached to shaft 114 through the access opening 140 causes rotation of week wheel 38 and tilting of light shield 72. Shaft 114 is rotated until such time as the correct chronological week of the year appears in window 142. At that time, because of the mechanical connection between cam 92 and wheel 38 by shaft 114, the tilt of shield 72 reorients itself with respect to globe 12 to coincide with the chronological week of the year being set on week wheel 38. Removal of the drive member from shaft 114 causes clutch member 116 to again engage with worm wheel 112 due to the action of spring 166 and the reverse rotations of crank arm 158, tee-shaped lever 152, and lever member 144. The week wheel 38 and the light shield 72 are now again connected to motor 96.

Figure 13:
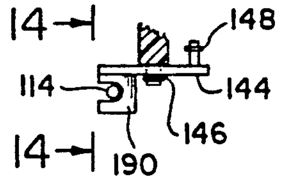
FIG. 13 is a view taken along the line 13—13 of FIG. 6.
Figure 14:
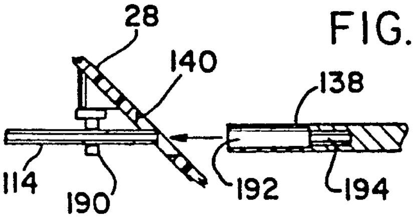
FIG. 14 is a view taken along the line 14—14 of FIG. 13.

Further details of the lever 144 and the use of the drive member 138 onto shaft 114 is shown in FIGS. 13 and 14 of the drawings. As seen in FIG. 14, the drive member 138 includes an opening 192 which is axially aligned with drive opening 194. Opening 192 allows drive member 138 to be inserted onto shaft 114 such that the end of drive member 138 pushes against the flange 190 of lever 144 which causes, as previously stated, disengagement of clutch 116 from worm wheel 112. Further engagement of drive member 138 onto shaft 114 results in engagement of the hex drive opening 194 onto hexagonal shaft 114 which then allows for rotation of shaft 114 to set week wheel 38 and tilt of light shield 72.

Substantially diametrically opposite access hole 140 on geographic zone dial 28, is a second access hole 168 which provides access to a hexagonal shaft 170. Drive member 138 may also be used with regard to hexagonal shaft 170 in order to set the clock time zone dial 30 relative to geographical zone dial 28 and to set the clock time zone dial 30 relative to local time indicator time zone dial 32 and the globe 12 relative to light shield 72.

Figure 11:
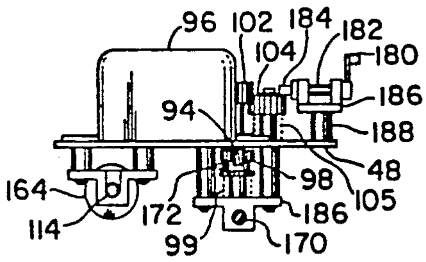
FIG. 11 is a partial view of the clock motor mechanism of the world globe taken along the line 11—11 of FIG. 4.

Insertion of drive member 138 into access hole 168 causes pushing on the tee-shaped lever member 152 by the forward edge of drive member 138. Counterclockwise rotation of lever member 152 again results in tension in cable 156 and rotation of crank 160. Rotation of crank 160 causes rotation of the second arm 172 attached thereto which engages a circumferential groove around the periphery of idler gear 98 (FIG. 11). Idler gear 98 is spring biased upwardly by a spring 99 to engage gear 100 (FIG. 3). The rotation of crank 160 and crank arm 172 causes downward motion of gear 98 which compresses spring 99 and disengages gear 98 from gear 100. The disengagement of gear 98 from gear 100 allows free rotation of shaft 170. Drive member 138 may then be used to rotate shaft 170, which drives a miter gear set 174 which, in turn, is directly connected to gear 102. As seen in FIG. 16 of the drawings, rotation of gear 102 directly drives clock time zone dial 30 and through idler g ®ar 104 drives gear 56 which is directly connected to local time indicator time zone dial 32. Hence, rotation of drive member 138 allows for the setting of the clock time zone dial 30 relative to geographical zone dial 28 and the setting of time zone local time indicator time zone dial 32 and Greenwich time zone dial 34 and globe 12 relative to light shield 72. Rotation of drive member 138 on shaft 170 does not affect the previous setting of the tilt of light shield 72 nor the week wheel 38.

In order to move clock time zone dial 30 independent of local time indicator time zone dial 32 and Greenwich time zone dial 34, the following apparatus is applicable. Slightly to the side of access opening 168 is another access opening 175 on geographical zone dial 28. Within access opening 175, a hexagonal shaft 178 with a knob 176 thereon extends to a second crank member 182 having a first lever arm 180 and a second lever arm 184 attached thereto. A pushing motion applied to the shaft 178 causes rotation of lever arm 180 and also rotation of lever arm 184. Shaft 178 can be locked in the "in" position by pressing on knob 176 against spring 173 rotating knob 176 about 90° clockwise so that extension 183 engages recess 177 of access opening 175. See FIGS. 3, 4 and 11 and of the drawings. An extension !84 to crank member 182 bears against the upper surface of gear 104 which is biased upward by spring member 105. Rotation of crank member 182 causes gear 104 to move axially downward against the resistance of spring 105 and to disengage from gear 102. Hence, gear 102 is freed from its connection to local time indicator time zone dial 32 and Greenwich time zone dial 34. Now, when shaft 170 is rotated by drive member 138 while maintaining the locked-in position of extension 183 in recess 177, clock time zone dial 30 is moved independent of all other mechanisms. The independent motion of clock time zone dial 30 allows the setting for the correct time of the day relative to the marking line 130 on local time indicator time zone dial 32, which has been previously set to the correct Greenwich time zone. Then, releasing the extension 183 from recess 177 followed by rotation of shaft 170, the clock time zone dial 30 is set such that the correct local time occurs at the geographical location of the user on geographical zone dial 28.

It is to be noted that knob 175 mechanism and crank member along with their associated components e.g. shaft 178, crank extensions 180, 184, detent 177, opening 175 etcetera may be eliminated by setting at the correct factory the correct Greenwich time relative to the markings on zone wheel 32 for either daylight savings time or eastern standard time and then setting the dawn line at a particular geographic location at a time corresponding to sunrise at that particular geographic location. Once set for a particular location, sunrise for all the other world locations are automatically all set. It is then merely necessary to adjust for actual local time and then for daylight savings time 130A or eastern standard time 130 as explained hereinafter. But, it is required to retain the function of displacing gear 104 in order to set the sunrise or dawn line at the factory.

Figure 17:
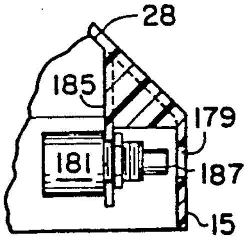
FIG. 17 is a sectional view taken along the line 17—17 of FIG. 2.
Figure 15:
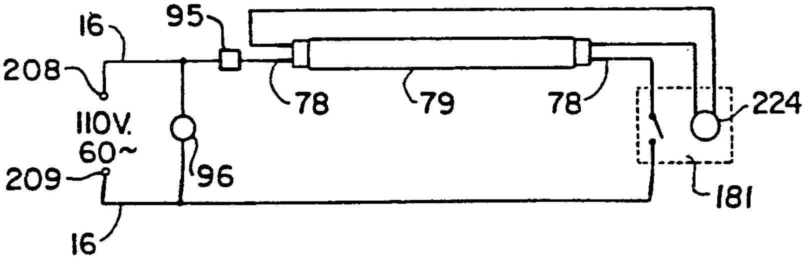
FIG. 15 is an electrical wiring schematic of the light arrangement.

In FIG. 15, line cord 16 is shown connected to a 120 V AC source which starts electric motor 96. The six watt fluorescent tube comprising light 79 is separately controlled by switch 181 which contains the necessary starter 224. A ballast 95 is in series with lamp 79. This arrangement allows the user to turn off light 79 while motor 96 continues to cycle. In FIG. 17, switch 181 is shown mounted on a bracket 185. Switch 181 is of the push-to-close/push-to-open type with access through an opening 179.

In accordance with the above, when the world globe and drive arrangement 10 is to become operable for the first time and after applying electricity, the following procedure may be used. For explanation purposes, the world globe and drive arrangement 10 will be set for April 1 (Eastern Standard time) at a geographical location of Washington, D.C., U.S.A. at 10:00 A.M. Firstly, it is to be noted that the globe 12 has been preset relative to zone dial 34 so that the Greenwich time zones on globe 12 corresponds to the Greenwich time markings on zone dial 34. Since Washington, D.C. is in the plus five Greenwich time zone, the marking line 130 on local time indicator time zone dial 32 is set to coincide with the plus five marking on Greenwich time zone dial 34.

The next item to be set is the calendar wheel 38. April 1 is within the thirteenth week of the year. By utilizing key 138 within access hole 140, the clock drive mechanism is disconnected and key 138 is rotated turning shaft 114 until the number thirteen appears in the window of port 142. It is to be noted that rotation of shaft 114 to set the week of the year within the viewing port 142 automatically tilts light shield 72 so that the relative location of light shield 72 to the globe 12 corresponds with the season of the thirteenth week of the year. Accordingly, the seasonal display shows early spring in Washington, D.C. in the northern hemisphere.

The next operation to set zone dials 32 and 34 relative to light shield 72. From an appropriate source, it is learned that Washington, D.C. has a sunrise at approximately 6:00 A.M. Eastern Standard time on the 1st day of April. With this information in mind, the user inserts key 138 into access hole 168 which results in, as explained above, disconnection of light-shield 72 relative to zone dials 32 and 34. Rotation of shaft 170 with key 138 rotates zone dials 32 and 34 and thusly rotates globe 12, independent of light-shield 72. Shaft 170 is rotated until such time as Washington, D.C. on globe 12 is positioned on the dawn line cast by light shield 72. Then, the user presses on knob 176 and locks the same within detent 177 of opening 175. This separates zone wheel 30 from zone wheels 32 and 34. With key 138 pressed against shaft 170, key 138 is rotated, rotating shaft 170 and time zone dial 30 all by itself. Zone dial 30 is then set such that 6:00 A.M. is aligned with mark 130.

The final operation comprises setting of the zone dial 30 to the actual local time of Washington, D.C. In order to do this, it is merely required to release knob 176 and using key 138, rotate time zone drive 30 to the actual time 10:00 A.M. relative to the geographic location of Washington, D.C. and zone dial 28. Rotating key 138 at this time rotates both zone dials 30 and 32 in opposite directions. Since the light shield 72 has been properly set for sunrise at 6:00 A.M., the setting of the actual time rotates the light-shield 72 to that corresponding to 10:00 A.M. at the geographical location of Washington, D.C. on zone dial 28. Key 138 may now be removed.

At this time; the world globe and drive arrangement 10 is set for the then-time 10:00 A.M. Eastern Standard time of the user at a Washington, D.C., U.S.A. geographical location on the 1st of April.

When daylight savings time occurs it is necessary to reset the sunrise time of world globe and drive arrangement 10. This is simply accomplished by locking knob 176 in place and rotating shaft 170 by key 138 such that sunrise occurs one hour later than the then setting of zone wheel 30 relative to geographical zone dial 28 (i.e. move zone wheel 30 ahead one hour). Resetting back to Eastern Standard time is accomplished by setting time zone dial 30 back one hour.

Another way to reset the world globe and drive arrangement 10 to daylight savings time and vice versa where locking knob 176 is removed is as follows: Push key 138 in at the access opening 168 and rotate zone wheels 32 and 30 relative to each other to change the time by one hour e.g. at noon move zone 30 such that noon is reset to the daylight savings time 130A on zone wheel 32. This however, changes light-shield 72 relative to globe 12 by one hour. To correct his, grasp globe 12 and move zone wheel 34 ahead one hour relative to zone wheel 32 (one [1] time meridian zone). This readjusts the globe 12 one hour relative to the light-shield 72.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. An electrically driven, world globe displaying Greenwich time, clock time, week of the year, season of the year and daylight-nighttime of a particular geographic location and a particular time of day relative to the rest of the world comprising:

a globe displaying a geographical arrangement of the world, a Greenwich time zone dial fixedly attached to said globe displaying Greenwich time relative to longitudinal location of the geographic arrangement of the world, said globe and said Greenwich time zone dial together rotating in a first direction one revolution every twenty-four hours, a clock time zone dial rotating in a second direction opposite to said first direction, rotating one revolution every twenty-four hours, a stationary geographic zone dial indicating cities and countries of the world, said zone dials being arranged as levels of a frusto-conical structure with the world globe on top thereof with a north-south pole axis aligned with the axis of the frusto-conical structure, and an electrical drive motor for rotating said globe, said Greenwich time zone dial and said clock time zone dial.

2. The world globe apparatus of claim 1, including a marking line indicator zone dial between said Greenwich time zone dial and said clock time zone dial arrangement to rotate with said Greenwich time zone dial.

3. The world globe apparatus of claim 1, including a lazy susan base structure under said frusto-conical structure for rotating said frusto-conical structure and said globe as a single unit relative to said lazy susan base structure.

4. The world globe apparatus of claim 2, including a week of the year dial indicating the numerical weeks of the year thereon, said week of the year dial being arranged to display a numerical week of the year through an opening in said stationary geographic zone dial, said week of the year dial rotating one revolution per year.

5. The world globe apparatus of claim 1, including means for disconnecting and separately setting said clock time zone dial relative to said globe and said geographic zone dial.

6. The world globe apparatus of claim 2, including means for disconnecting and separately setting said clock time zone dial relative to a said world globe and to said marking line indicator zone dial.

7. The world globe apparatus of claim 4, including means for disconnecting and separately setting a particular week of the year on said week of the year dial.

8. The world globe apparatus of claim 7, including means for indicating daytime-nighttime lighting on said world globe and being operationally connected to said week of the year dial.

9. The world globe apparatus of claim 8, wherein said daytime-nighttime lighting means comprises a generally circular disk located within said globe and a light source positioned on one side of said disk.

10. The world globe apparatus of claim 9, including means for disconnecting and separately setting the location of said disk and light source relative to a particular geographic location on said globe.

11. The world globe apparatus of claim 9, further comprising a support rod arranged along a central axis of said frusto-conical structure extending at one end to the approximate center of said disk and at its other end to a chassis plate arranged perpendicular to said axis of said frusto-conical structure, said chassis plate being structurally connected to and within said geographic zone dial.

12. The world globe apparatus of claim 11, including a connecting rod within said support rod extending at one end from a cam which rotates one revolution per year and at an opposite end to a linkage arrangement connected to said daytime-nighttime disk, whereby said disk and light pivot relative to the north-south pole axis of said globe in accordance with the seasons of the year.

13. The world globe apparatus of claim 12, wherein said linkage arrangement comprises a first linkage arm rigidly attached to said one end of the connecting rod, a second linkage arm pivotally connected to said one end of the support rod, and a third linkage arm pivotally connected at one end to said first linkage arm and at a second opposite end to said second linkage arm whereby axial movement of said connecting rod tilts said disk and light.

14. The world globe apparatus of claim 11, wherein said light is mounted to a support base which is slidingly mounted within a track whereby said light and support base may be slidingly removed from said track while maintaining an electrical contact between said light and electrical wiring connected to an appropriate voltage source.

15. The world globe apparatus of claim 14, wherein said globe includes an opening covered by a removable disk located at the north pole of said globe whereby said light and support base may be withdrawn therefrom through said opening.

16. The world globe apparatus of claim 12, wherein said connecting rod includes a cam follower attached to said opposite end thereof, said follower being slidingly connected to a groove within said cam whereby rotation of said cam imparts axial motion to said connecting rod.

17. The world globe apparatus of claim 12, wherein said cam and said week wheel are each connected to a common drive shaft.

18. The world globe apparatus of claim 17, wherein said cam and week wheel connections each comprise a worm and a worm wheel arrangement.

19. The world globe apparatus of claim 2, further comprising a synchronous, alternating current motor gearingly connected to said Greenwich time zone dial and to said clock time zone dial whereby each of said dials rotate in said opposite directions, each making said one revolution per day.

20. The world globe apparatus of claim 2, including a releasable connection between said marking line dial and said Greenwich time zone dial comprising a spring-loaded pawl with a vee-shaped protrusion thereon and a mating vee-shaped detent, said spring-loaded pawl being attached to one of said dials and said mating vee-shaped detent being attached to the other of said dials.

21. The world globe apparatus of claim 14, wherein said electrical wiring comprises an electrical end plug and two wire conductors connected to and though said lazy susan apparatus to said electrical drive motor and to said daytime-nighttime lighting.

22. The world globe apparatus of claim 21, wherein said two-wire conductors are routed from said lazy susan through said support rod to said daytime-nighttime lighting.

23. The world globe apparatus of claim 2 wherein said marking line indicator zone dial includes a daylight savings time line and an Eastern Standard time line.

* * * * *